(12) United States Patent
Mizutani

(10) Patent No.: US 9,183,448 B2
(45) Date of Patent: Nov. 10, 2015

(54) APPROACHING-OBJECT DETECTOR, APPROACHING OBJECT DETECTING METHOD, AND RECORDING MEDIUM STORING ITS PROGRAM

(71) Applicant: FUJITSU LIMITED, Kawasaki-shi, Kanagawa (JP)

(72) Inventor: Masami Mizutani, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 52 days.

(21) Appl. No.: 14/079,094

(22) Filed: Nov. 13, 2013

(65) Prior Publication Data

US 2014/0064562 A1    Mar. 6, 2014

Related U.S. Application Data

(63) Continuation of application No. PCT/JP2011/061914, filed on May 24, 2011.

(51) Int. Cl.
  *G06K 9/00* (2006.01)
  *G06T 7/20* (2006.01)

(52) U.S. Cl.
  CPC .......... *G06K 9/00805* (2013.01); *G06T 7/2033* (2013.01); *G06T 2207/10016* (2013.01); *G06T 2207/30261* (2013.01)

(58) Field of Classification Search
  CPC .............................. G06K 9/00; G06T 2207/30
  USPC ........................................................ 382/103
  See application file for complete search history.

(56) References Cited

U.S. PATENT DOCUMENTS

| 6,512,537 | B1 | 1/2003 | Shimizu et al. | |
|---|---|---|---|---|
| 2006/0244866 | A1* | 11/2006 | Kishida | 348/699 |
| 2009/0252377 | A1* | 10/2009 | Akita et al. | 382/106 |
| 2010/0177936 | A1* | 7/2010 | Ebling et al. | 382/107 |

(Continued)

FOREIGN PATENT DOCUMENTS

| JP | 64-48181 | 2/1989 |
|---|---|---|
| JP | 2000-059796 | 2/2000 |
| JP | 2006-079594 | 3/2006 |

(Continued)

OTHER PUBLICATIONS

International Search Report, mailed in connection with PCT/JP2011/061914 and mailed Jun. 21, 2011.

(Continued)

*Primary Examiner* — Nirav G Patel
*Assistant Examiner* — Delomia Gilliard
(74) *Attorney, Agent, or Firm* — Fujitsu Patent Center

(57) ABSTRACT

An approaching-object detector for detecting an object approaching an own vehicle includes: a memory; and a processor configured to perform a process, the process including extracting a plurality of corresponding feature points from chronologically captured images, which are obtained by capturing the object using an imaging device provided for the own device, detecting a behavior among the captured images in regard to each of the plurality of feature points, determining whether or not the behavior is random in regard to each of the plurality of feature points, and determining whether or not the object is approaching the own vehicle based on a behavior of a feature point whose behavior is determined to be not random among the plurality of feature points, and outputting a result of the determination.

6 Claims, 8 Drawing Sheets

(56) References Cited

U.S. PATENT DOCUMENTS

| | | | |
|---|---|---|---|
| 2010/0202661 A1* | 8/2010 | Mizutani | 382/103 |
| 2011/0228985 A1* | 9/2011 | Uchida et al. | 382/103 |

FOREIGN PATENT DOCUMENTS

| | | | |
|---|---|---|---|
| JP | 2006-260049 | | 9/2006 |
| JP | 2007-172540 | | 7/2007 |
| JP | 2008-117119 | | 5/2008 |
| JP | 2010-128869 | | 6/2010 |
| JP | 2010128869 A | * | 6/2010 |
| WO | 2009/078056 | | 6/2009 |

OTHER PUBLICATIONS

Notification of Transmittal of Translation of the International Preliminary Report on Patentability (Form PCT/IB/338, Form PCT/IB/373 & Form PCT/ISA/237), PCT/JP2011/061914, 7 pages, dated Dec. 5, 2013.

Japanese Office Action mailed Feb. 24, 2015 for corresponding Japanese Patent Application No. 2013-516113, with Partial English Translation, 5 pages.

* cited by examiner

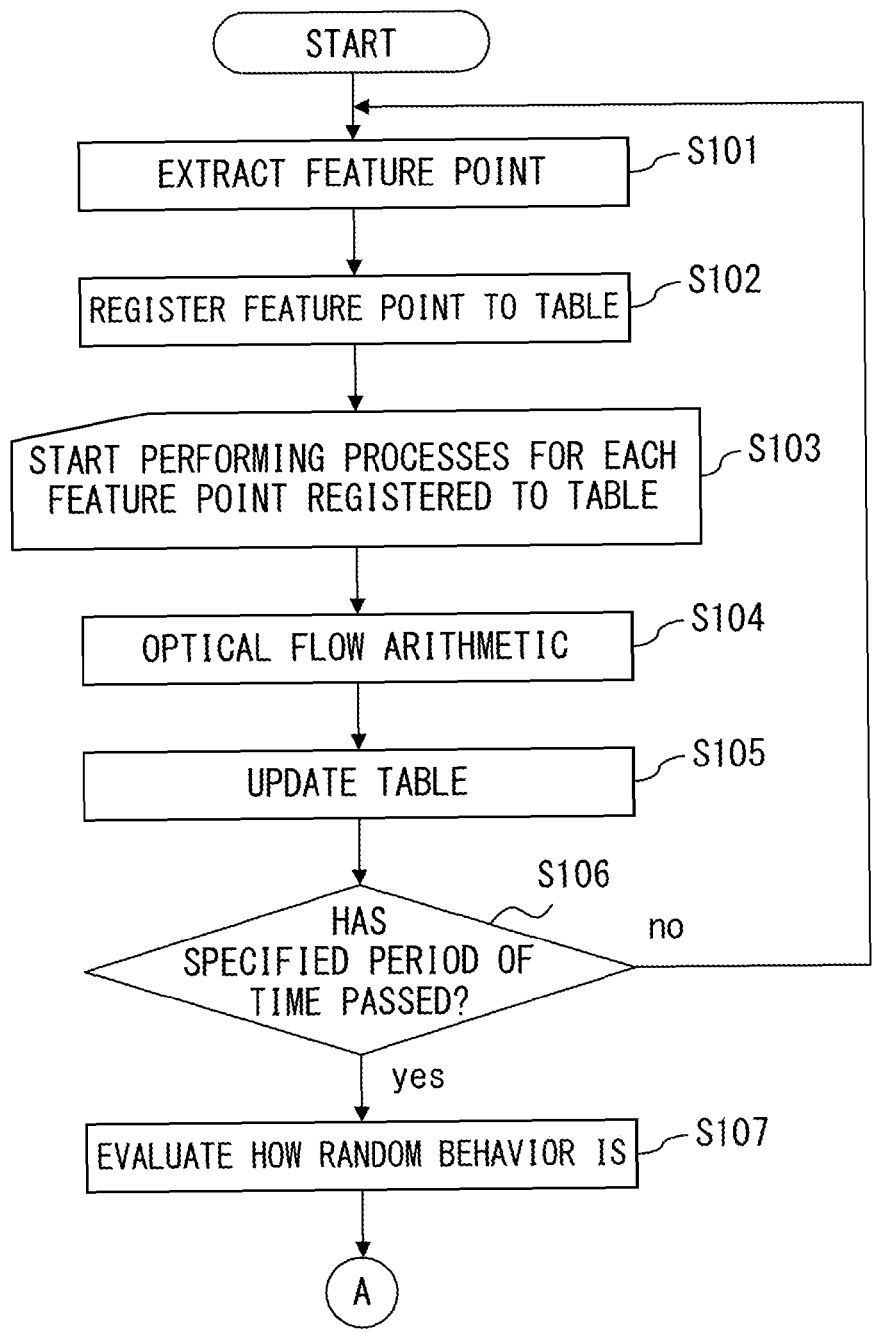
F I G. 3 A

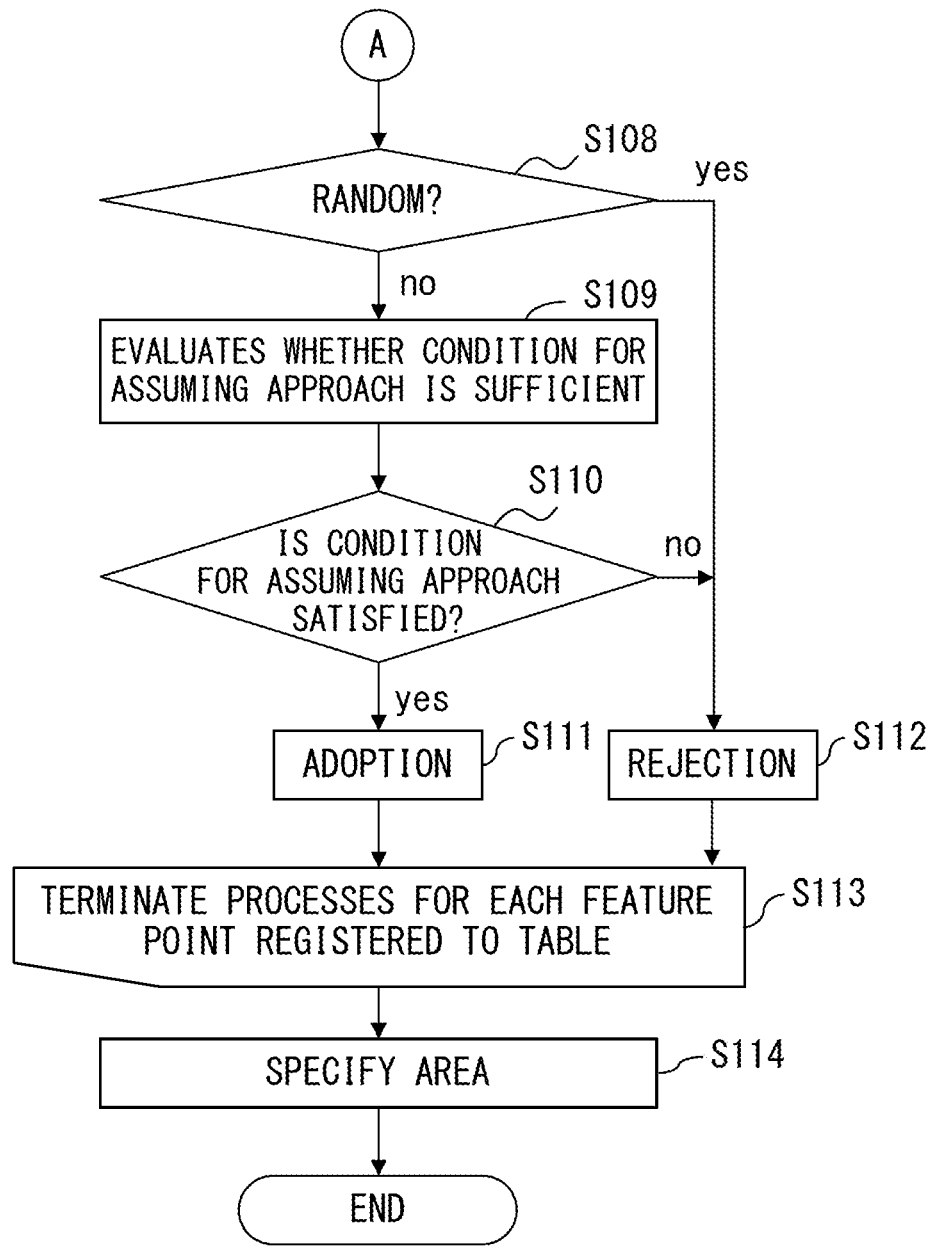
F I G. 3 B

| LATEST ID | SURROUNDING IMAGE DATA | FEATURE POINT COORDINATES | TIME | OPTICAL FLOW | IMMEDIATELY PRECEDING ID |
|---|---|---|---|---|---|
| 11 | DATA#1 | X11, Y11 | t | Vx11, Vy11 | 01 |
| 12 | DATA#2 | X12, Y12 | t | Vx12, Vy12 | 02 |
| 13 | DATA#3 | X13, Y13 | t | Vx13, Vy13 | 03 |

FIG. 4

APPROACHING-OBJECT DETECTOR, APPROACHING OBJECT DETECTING METHOD, AND RECORDING MEDIUM STORING ITS PROGRAM

CROSS-REFERENCE TO RELATED APPLICATION

This application is a continuation application of International Application PCT/JP2011/061914 filed on May 24, 2011, which designates the U.S., the entire contents of which are incorporated herein by reference.

FIELD

The embodiments discussed herein relate to a technique for detecting an object approaching the own vehicle.

BACKGROUND

A technique for detecting objects (for example, other vehicles) approaching the own vehicle by performing image processing on images captured by a camera provided for the own vehicle is known.

As one of the image processing techniques used for the above-indicated technique, a technique is known for identifying an image area of a moving object appearing in the captured images based on an optical flow of the feature point extracted from the chronologically captured images that form the moving images captured by the camera. Note that an optical flow is motion vector information indicating the visible motion of an object on an image, which may be obtained, for example, by searching the corresponding point of the same object (for example, feature point) between two chronological images.

Moreover, a technique is known for detecting an approaching moving object based on an angle difference between a specified approaching direction and a motion vector obtained from a connected block formed by connecting pixels where the angle difference of motion vectors is equal to or less than a specified threshold among pixels that form a captured image.

Further, a technique is known for improving the detection accuracy of moving objects at a long distance with smaller capacity of memory and less computational complexity when moving objects are detected from moving images, where the detection accuracy of moving objects at a short distance is also maintained. In this technique, an attempt is made to detect the motion of an object between chronologically continuous two image frames by using, for example, an optical flow. When such motion is successfully detected, the detected motion is tracked. When the detection of such motion has failed, the motion is evaluated again by using an image frame of the next time or later.

Patent Document 1: Japanese Laid-open Patent Publication No. 64-048181
Patent Document 2: Japanese Laid-open Patent Publication No. 2007-172540
Patent Document 3: International Publication Pamphlet No. 2009/078056

SUMMARY

An approaching-object detector for detecting an object approaching an own vehicle, as will be described later in the present specification, includes: a memory; and a processor configured to perform a process. The processor is configured to perform a process including: extracting a plurality of corresponding feature points from chronologically captured images, which are obtained by capturing the object using an imaging device provided for the own device; detecting a behavior among the captured images in regard to each of the plurality of feature points; determining whether or not the behavior is random in regard to each of the plurality of feature points; and determining whether or not the object is approaching the own vehicle based on a behavior of a feature point whose behavior is determined to be not random among the plurality of feature points, and outputting a result of the determination.

An approaching object detecting method, as will be described later in the present specification, is a method for causing a computer to detect an object approaching an own vehicle. Firstly, the method includes extracting a plurality of corresponding feature points from chronologically captured images, which are obtained by capturing the object using an imaging device provided for the own device. Next, the method includes detecting a behavior among the captured images in regard to each of the plurality of extracted feature points. Next, the method includes determining whether or not the behavior is random in regard to each of the plurality of extracted feature points. Lastly, the method includes determining whether or not the object is approaching the own vehicle based on a behavior of a feature point whose behavior is determined to be not random among the plurality of extracted feature points, and outputting a result of the determination.

One of the stored computer-readable recording media, as will be described later in the present specification, is a computer-readable recording medium having stored therein a program for causing a computer to execute a process for detecting an object approaching an own device. Firstly, the process includes extracting a plurality of corresponding feature points from chronologically captured images, which are obtained by capturing the object using an imaging device provided for the own device. Next, the process includes detecting a behavior among the captured images in regard to each of the plurality of extracted feature points. Next, the process includes determining whether or not the behavior is random in regard to each of the plurality of extracted feature points. Lastly, the process includes determining whether or not the object is approaching the own vehicle based on a behavior of a feature point whose behavior is determined to be not random among the plurality of extracted feature points, and outputting a result of the determination.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 3A and 3B are a flowchart illustrating how an approaching-object detecting process is performed.
FIG. 4 illustrates the structure of a feature point tracking management table.

DESCRIPTION OF EMBODIMENTS

Figure 1:
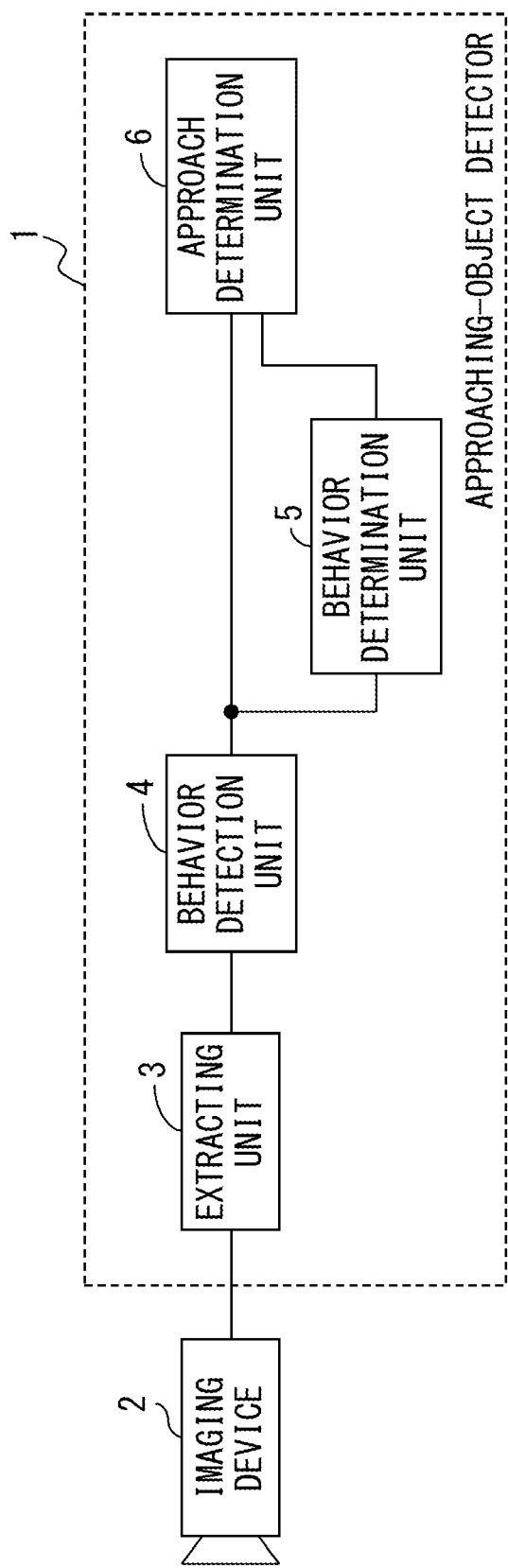
FIG. 1 is a functional block diagram illustrating one embodiment of an approaching-object detector.

How the image of an object appearing on the image around the own vehicle captured by a camera provided for the own vehicle changes differs depending on the positional relationship between the object and the camera even when the size of the object is the same and the object is approaching the own vehicle at the same speed. For example, the motion of a feature point on an image corresponding to a far object appears smaller than a feature point on an image corresponding to a close object.

Even when a feature point is of the same object, the moving direction of such a feature point differs depending on the moving direction of the object with reference to the center of the optical axis of a camera. For example, when an object is approaching a camera from the front of the camera, it appears as if feature points on an image corresponding to portions of the object are moving in a radially expanding direction. For example, when the sight of another vehicle travelling on a side of the own vehicle overtaking the own vehicle is captured by a camera that captures images on a side of the own vehicle from the own vehicle, the tracks of feature points on an image corresponding to portions of the other vehicle indicate a barrel shape that expands around the center of the image and gets narrower near the edges of the image.

Accordingly, even when a plurality of feature points are extracted from different portions of the same object, the optical flow may be different from each other among the feature points depending on the distance between the object and a camera or the moving direction of the object.

In a technique for detecting an image area of a moving object from an image by using an optical flow, an image area formed by collecting feature points whose optical flow is the same from the feature points that form an image is detected as an image area of a moving object. However, in view of the above-indicated circumstances, when an approaching object detection is performed by using an optical flow of feature points extracted from the images captured by a vehicle-mounted camera, it is determined that a feature point having a similar optical flow to a certain extent makes up an image area of an approaching object.

In reality, when grouping of feature points that make up an image area of an approaching object is performed not very precisely as described above, in the cases of [1] to [3] below for example, a feature point that does not belong to an approaching object may be erroneously determined to be a feature point that makes up an image area of an approaching object.

[1] In order to calculate the optical flow of a feature point, corresponding feature points are searched for between the two chronological images of the first image and the second image. However, when the own vehicle is travelling at high speed, there are some cases in which the amount of the travel of the position of a feature point on an image between the first image and the second image becomes excessively large and the position of the feature point goes out of the search area of the second image. In such cases, a pixel that is not in the corresponding relationship between the first image and the second image may be erroneously extracted as a feature point from the second image. Accordingly, an erroneous optical flow of a feature point is obtained, and detection of an image area of an approaching object may end in an error.

[2] For example, there are some cases in which an edge of a white line painted on the road as a continuous straight line, which indicates the boundary of lanes, is selected as a feature point. Such a painted white line is captured in a similar composition between the first image and the second image, and thus it is difficult to search the second image for a pixel that corresponds to a feature point selected from an image of the painted white line on the first image. Accordingly, the relationship of a feature point between the two images is often not uniquely determined. For this reason, also in the above cases, a pixel that is not in the corresponding relationship between the first image and the second image may be erroneously extracted as a feature point. Accordingly, an erroneous optical flow of a feature point is obtained, and detection of an image area of an approaching object may end in an error.

[3] For example, there are some cases in which noise caused at a camera due to a dim object stands out on a captured image when an image is captured at a nighttime or twilight time, and such a noise that does not exist in reality on the own vehicle side is erroneously selected as a feature point. If such an erroneously selected feature point is extracted as an image area of an approaching object, detection of an image area of an approaching object ends in failure.

It is apparent that if false detection of an image area of an approaching object occurs due to such causes as above, detection of an object that approaches the own vehicle may end in failure.

It is an object of an approaching-object detector, as will be described later in the present specification, to improve the accuracy of detection of an object that approaches the own vehicle in view of the problems discussed above.

Firstly, FIG. 1 will be explained. FIG. 1 is a functional block diagram illustrating one embodiment of an approaching-object detector.

An approaching-object detector 1 of FIG. 1 is a device that detects an object approaching the own vehicle.

An imaging device 2 provided for the own vehicle is connected to the approaching-object detector 1. The approaching-object detector 1 includes an extraction unit 3, a behavior detection unit 4, a behavior determination unit 5, and an approach determination unit 6.

The extraction unit 3 extracts a plurality of corresponding feature points in the chronologically captured images, which are obtained by capturing the object using the imaging device 2.

The behavior detection unit 4 detects a behavior among the captured images in regard to each of the feature points extracted by the extraction unit 3.

The behavior determination unit 5 determines whether or not the behavior detected by the behavior detection unit 4 in regard to each of the feature points extracted by the extraction unit 3 is random.

The approach determination unit 6 determines whether or not an object is approaching the own vehicle, and outputs the results of the determination. The approach determination unit 6 performs such determination based on the behavior of the feature point that is determined by the behavior determination unit 5 that the above behavior is not random among the feature points extracted by the extraction unit 3.

It is apparent that the behavior of a feature point over the course of time, which causes false detection of an object approaching the own vehicle as in [1] to [3] as discussed above, becomes random. In view of the above, the approaching-object detector 1 is configured to include the above elements and to determine whether or not an object is approaching the own vehicle based on only the feature points having some sort of regularity in the behavior from among the feature points extracted from captured images. In other words, the approaching-object detector 1 does not use a feature point whose behavior is random as a reference for the determination process. By so doing, false detection in the above-indicated cases of [1] to [3] is prevented from occurring, and detection accuracy of an object approaching the own vehicle is improved.

In the approaching-object detector 1 of FIG. 1, the behavior detection unit 4 may be configured to detect an optical flow in regard to each of the feature points extracted by the extraction unit 3 from the above chronologically captured images. In such a configuration, the behavior determination unit 5 determines whether or not a behavior is random based on the amount of a temporal change in the direction of the detected optical flow. In particular, the behavior determination unit 5 calculates a change in the direction of optical flow between chronologically continuous two optical flows in regard to one of the feature points extracted by the extraction unit 3. When the degree where the change in the direction is equal to or greater than a specified angle is greater than a specified degree during a specified period of time, the behavior determination unit 5 determines that the behavior of the one feature point is random. On the other hand, when the degree is smaller than the specified degree during the specified period of time, the behavior determination unit 5 determines that the behavior of the one feature point is not random. The behavior determination unit 5 may be configured to determine whether or not a behavior of a feature point is random in this way.

Figure 2:
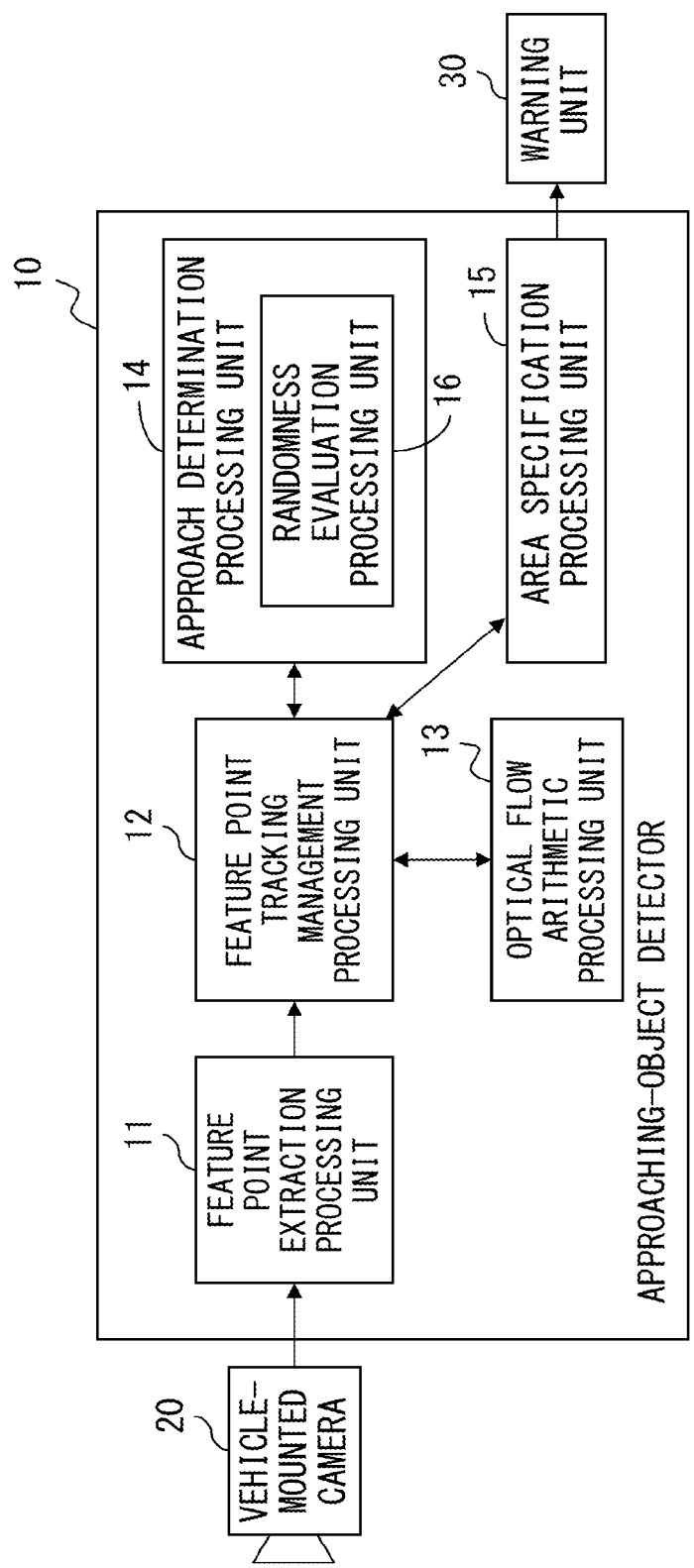
FIG. 2 is a functional block diagram of another embodiment of an approaching-object detector.

Next, FIG. 2 will be explained. FIG. 2 is a functional block diagram of another embodiment of an approaching-object detector.

An approaching-object detector 10 of FIG. 2 includes a feature point extraction processing unit 11, a feature point tracking management processing unit 12, an optical flow arithmetic processing unit 13, an approach determination processing unit 14, and a area specification processing unit 15. A vehicle-mounted camera 20 and a warning unit 30 are connected to the approaching-object detector 10.

The vehicle-mounted camera 20 is an imaging device provided for an own vehicle. In the present embodiment, a wide-angle lens (for example, diagonal fish-eye lens) by which a wide angle of view is obtained is provided for the vehicle-mounted camera 20, and a wide range of images on the sides of the own vehicle are obtained. Even when feature points extracted from the images captured by using such a wide-angle lens are used, the behavior of a feature point, which causes false detection of an object approaching the own vehicle as discussed above, still becomes random. As a matter of course, a standard lens by which a standard angle of view is obtained may be provided for the vehicle-mounted camera 20.

The moving images captured by the vehicle-mounted camera 20, i.e., two or more captured images as chronological still images, are input to the feature point extraction processing unit 11, and the feature point extraction processing unit 11 extracts a pixel of a feature point from the captured images.

The feature point tracking management processing unit 12 manages the feature points extracted by the feature point extraction processing unit 11, and tracks a corresponding feature point among the captured images.

The optical flow arithmetic processing unit 13 calculates an optical flow of the feature points extracted by the feature point extraction processing unit 11, which are originally included in the captured images captured by the vehicle-mounted camera 20.

The approach determination processing unit 14 determines whether or not the tracks of a feature point that is being tracked by the feature point tracking management processing unit 12 satisfies a specified condition, and excludes a feature point that satisfies the specified condition from a target area to be extracted by the area specification processing unit 15.

The area specification processing unit 15 collects feature points that were not excluded by the approach determination processing unit 14 and remained among the feature points extracted by the feature point extraction processing unit 11 to form an image area, and outputs the image of an object appearing on the obtained image area as a result of the detection of an approaching object.

The approach determination processing unit 14 in the approaching-object detector 10 of FIG. 2 includes a randomness evaluation processing unit 16. The randomness evaluation processing unit 16 performs randomness evaluation on the tracks of a feature point for each feature point. A reference value for an evaluation value is set to the approach determination processing unit 14 in advance as the above-indicated specified condition, and the approach determination processing unit 14 determines whether or not an evaluation value obtained by the evaluation performed by the randomness evaluation processing unit 16 is equal to or greater than the reference value. Then, a feature point where the evaluation value is equal to or greater than a specified reference value is excluded from a target area to be extracted by the area specification processing unit 15.

When a temporal change of an optical flow of a feature point which causes false detection of an object approaching the own vehicle as discussed above is observed, the direction of the optical flow changes at random. For this reason, the randomness evaluation processing unit 16 evaluates the randomness of the change in an optical flow of each feature point, and excludes a feature point whose evaluation value indicating a result of the evaluation indicates randomness higher than a specified value from a target area to be extracted by the area specification processing unit 15.

When a result of the detection of an approaching object is received from the area specification processing unit 15, the warning unit 30 alerts the driver of the own vehicle that an object approaching the own vehicle has been detected by using, for example, visual means by which an LED (light-emitting diode) is turned on or auditory means by which buzzer sound is made.

Note that the functions of the functional blocks of the approaching-object detector 1 of FIG. 1 are provided by the functional blocks of the approaching-object detector 10 of FIG. 2. In other words, the function of the extraction unit 3 is provided by the feature point extraction processing unit 11 in FIG. 2, and the function of the behavior detection unit 4 is provided by the feature point tracking management processing unit 12 and the optical flow arithmetic processing unit 13 in FIG. 2. Moreover, the function of the behavior determination unit 5 is provided by the approach determination processing unit 14 (and the randomness evaluation processing unit 16) in FIG. 2, and the function of the approach determination unit 6 is provided by the area specification processing unit 15 in FIG. 2.

Next, a procedure for detecting an object approaching an own device by the approaching-object detector 10 of FIG. 2 will be described with reference to FIGS. 3A and 3B. FIGS. 3A and 3B are a flowchart illustrating how the approaching-object detector 10 of FIG. 2 performs an approaching-object detecting process.

In FIGS. 3A and 3B, the extraction unit 3 firstly performs a feature point extracting process in S101. In this process, firstly, the extraction unit 3 receives the moving images captured by the vehicle-mounted camera 20, i.e., two or more captured images that are chronological still images, from the vehicle-mounted camera 20. Next, a pixel with a certain type of feature is extracted from the captured images. In this extracting process of the present embodiment, a pixel at a position where a feature of the shape is significant in the video of the captured images is extracted from the captured images. In particular, in this extracting process, a pixel at a position having the shape of a corner is extracted from the video of the captured images by using a well-known Harris Operator.

Next, In S102, the feature point tracking management processing unit 12 obtains information related to the feature point extracted in S101, and registers the obtained information to the feature point tracking management table on a feature point by feature point basis.

FIG. 4 illustrates the structure of a feature point tracking management table.

In this table, items of data including "latest ID", "surrounding image data", "feature point coordinates", "time", "optical flow", and "immediately preceding ID" are associated with each other on a feature point by feature point basis.

The "latest ID" is the data of identification number assigned to each feature point by the extraction unit 3 for the purpose of individually identifying the feature point extracted in S101.

The "surrounding image data" is the data of the pixel value of a pixel extracted from the data of a captured image from which a feature point has been extracted, which indicates an image (template) within a specified image area around the feature point. The surrounding image data is used in optical flow arithmetic processing, as will be described later.

The "feature point coordinates" are the data of coordinates that indicates the position of a feature point on an image.

The data of the "time" indicates the time taken to capture the image from which the feature point has been extracted. Accordingly, it is apparent that the feature points whose data of the "time" is the same were extracted from the same captured image.

The "optical flow" is the data of the components of the optical flow in regard to feature points, which is calculated from the captured images.

The "immediately preceding ID" is the "latest ID" that is extracted from the immediately preceding captured image of the captured image from which a feature point has been extracted in S101 as above, which was assigned to the feature point that corresponds to the extracted feature point. Accordingly, the relationship between the "latest ID" and the "immediately preceding ID" in a feature point tracking management table indicates the relationship between the feature points of captured images.

Note that the data of both the "optical flow" and "immediately preceding ID" is registered to a feature point tracking management table in the process of S105, as will be described later.

FIGS. 3A and 3B will be explained again. In S103, the processes for each feature point whose related information has been registered to a feature point tracking management table start. The processes of S104 to S112 subsequent to S103 are performed on a feature point by feature point basis.

Figure 5:
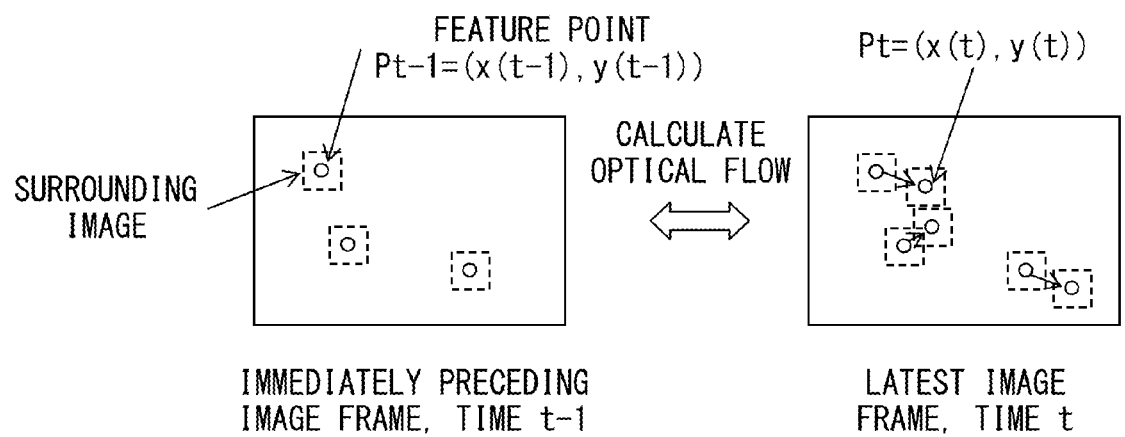
FIG. 5 is an explanatory schematic diagram of optical flow arithmetic.

Firstly, in S104, the optical flow arithmetic processing unit 13 performs optical flow arithmetic. This process will be described with reference to FIG. 5.

Attention is given to the latest image frame and the immediately preceding image frame among the captured images received by the approaching-object detector 10. Firstly, a feature point tracking management table is referred to, and the surrounding image data extracted from the immediately preceding image frame is obtained. Next, the latest image frame is referred to, and a block matching process is performed to seek out an image area where the similarity to the surrounding image data extracted from the immediately preceding image frame is the greatest among image areas having the same size as the template extracted from the latest image frame. Then, the coordinates of the feature points extracted from the immediately preceding image frame and the coordinates of the center pixels of the image areas sought out from the latest image frame in the block matching process are referred to, and motion vectors of the relevant feature points from the immediately preceding image frame to the latest image frame are calculated. The motion vectors obtained in the above process form an optical flow of the relevant feature point from the immediately preceding frame to the latest frame.

FIGS. 3A and 3B will be explained again. Next, in S105, the feature point tracking management processing unit 12 updates a feature point tracking management table. In this process, firstly, the components of the optical flow calculated from feature points to be processed in the process of S104 are registered to the column of "optical flow" of the relevant feature point in the feature point tracking management table. Further, the data of the identification number that was assigned as "latest ID" to the feature point of the immediately preceding image frame used to calculate an optical flow in the process of S104 is registered in the column of the "immediately preceding ID" of the relevant feature point in the feature point tracking management table.

Next, in S106, the approach determination processing unit 14 determines whether or not a timer (not illustrated) that measures an elapsed time has measured a specified period of time, which is a period of time sufficient to calculate an optical flow of the same feature point a specified number of times. When it is determined that a specified period of time has been measured (i.e., when the result of determination is "Yes"), the process proceeds to S107. When it is determined that a specified period of time has not yet been measured (i.e., when the result of determination is "No"), the process returns to S101 and the above processes are performed again.

Next, in S107, the randomness evaluation processing unit 16 evaluates how random the behavior of a feature point to be processed is.

In the present embodiment, such randomness evaluation is performed by using the optical flow of a feature point over several time points between a time point earlier than current time t0 by time n and the current time t0.

Here, an optical flow Pt of a feature point P at time t is as follows.

$$Pt=(x(t)-x(t-1), y(t)-y(t-1))$$

The coordinates of the feature point P at time t is "(x(t), y(t))", and the coordinates of the feature point P at time t−1 is "(x(t−1), y(t−1))".

The amount of direction change e (t) of the feature point P from optical flow Pt−1 at time t−1 to optical flow Pt−1 at time t is calculated by the following equation that is obtained by transforming a deriving expression for an inner product of a vector.

$$\theta(t)=a\cos\{(Pt \cdot Pt-1)/|Pt|\cdot|Pt-1|\}$$

Note that a function "a cos" is an arc cosine function.

θ(i) of a feature point to be processed is calculated, where "i" is, for example, an integer between t0−(n−2) and t0. Then, the number of angles that are greater than a specified angle θth among the calculated θ(t0−(n−2)), . . . , θ(t0) is calculated. Then, whether or not the number is greater than a specified number that has been set in advance is determined. Here, when the calculated number is greater than a specified number Nth, it is determined that the behavior of the feature point P is random. On the other hand, when the calculated number is equal to or less than a specified number Nth, it is determined that the behavior of the feature point P is not random.

For example, it is assumed that time t0–n is the time at which the fifth image captured earlier than the captured image obtained at current time t0, and θ(t0−3), θ(t0−2), θ(t0−1), and θ(t0) are calculated. Then, the number of angles that are greater than a specified angle θth (for example, 90°) among θ(t0−3), θ(t0−2), θ(t0−1), and θ(t0) is calculated. Here, when the number is greater than a specified number Nth (for example, three), it is evaluated that the behavior of the feature point is random. On the other hand, when the calculated number is equal to or less than a specified number Nth, it is evaluated that the behavior of the feature point is not random.

In S108, the approach determination processing unit 14 determines whether or not the behavior of a feature point to be processed has been evaluated to be random in the behavior randomness evaluation process of S107. When it is determined that the behavior of a feature point to be processed has been evaluated to be random (i.e., when the result of determination is "Yes"), the process proceeds to S112. On the other hand, when it is determined that the behavior of a feature point to be processed has been evaluated to be not random (i.e., when the result of determination is "No"), the process proceeds to S109.

In S109, the approach determination processing unit 14 evaluates whether a condition for assuming approach is sufficient so as to determine whether or not a feature point to be processed will make up an image of an object approaching the own vehicle. In S110, the approach determination processing unit 14 then determines whether or not a feature point to be processed satisfies a condition for assuming approach.

For example, when the images captured by the vehicle-mounted camera 20 are images on the left side of the own vehicle, the direction of an optical flow becomes a right direction with respect to a feature point extracted from the captured images of an object approaching the own vehicle from a rear direction (i.e., for example, another vehicle that is overtaking the own vehicle). On the other hand, the direction of an optical flow becomes the reverse direction (i.e., left direction) with respect to a feature point of background images extracted from the captured images. In such cases, the direction of an optical flow is set to be a right direction as a condition for assuming approach in advance. Then, in the process of S109, a feature point management table is referred to for a latest frame, and in the subsequent process of S110, and it is determined whether or not the direction of an optical flow of a feature point to be processed is in a right direction.

When it is determined in the determination process of S110 that a feature point to be processed is evaluated to be satisfying a condition for assuming approach (i.e., when the result of determination is "Yes"), the process proceeds to S111. On the other hand, when it is determined that a feature point to be processed is evaluated to be not satisfying a condition for assuming approach (i.e., when the result of determination is "No"), the process proceeds to S112.

In S111, the approach determination processing unit 14 adopts a feature point to be processed as a target area to be extracted by the area specification processing unit 15. After that, the process proceeds to S113.

In S112, the approach determination processing unit 14 rejects a feature point to be processed, and excludes the rejected feature point from a target area to be extracted by the area specification processing unit 15. After that, the process proceeds to S113.

In S113, the processes for each feature point whose related information has been registered to a feature point tracking management table, which were started in the process of S103, terminate.

In S114, the area specification processing unit 15 specifies an image area of an approaching object on the captured images from which feature points were extracted in the process of S101 by grouping the feature points adopted in the process of S111 together, and outputs the position information of the specified image area.

A method for grouping feature points by using the area specification processing unit 15 will be described with reference to FIG. 6.

Figure 6:
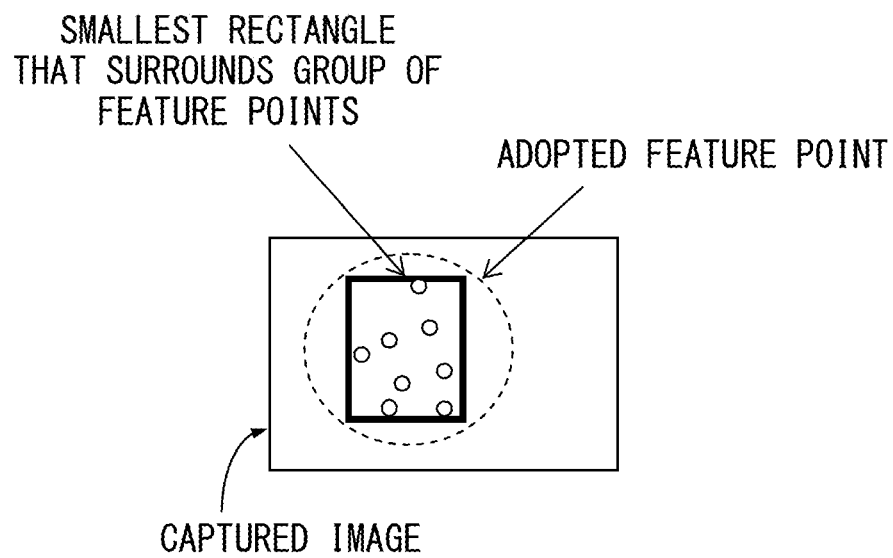
FIG. 6 is an explanatory schematic diagram illustrating how feature points are grouped.

In FIG. 6, points of open circles indicate feature points adopted in the process of S111. These adopted feature points are all positioned within the area circled by broken lines in the example of FIG. 6. In the present embodiment, the area specification processing unit 15 sets a smallest rectangle that surrounds all the feature points adopted in the process of S111 on a captured image, and regards this rectangular area as an image area of an approaching object.

When the processes up to S114 as described above are complete, the approaching-object detecting processes of FIGS. 3A and 3B terminates.

When the position information of an image area is received from the area specification processing unit 15, the warning unit 30 alerts the driver of the own vehicle that an object approaching the own vehicle has been detected as described above. The warning unit 30 may include a display device to display the images captured by the vehicle-mounted camera 20, and may superimpose the position information of an image area received from the area specification processing unit 15 on the display of the captured image.

As described above, the approaching-object detector 10 of FIG. 2 uses an optical flow of the feature point extracted from the captured images to detect an approaching object. The approaching-object detector 10 of FIG. 2 determines whether or not a behavior of each feature point is random based on the optical flow of several feature points, and the approaching-object detector 10 of FIG. 2 does not use a feature point whose behavior is random as a reference for the detection process of an approaching object. Accordingly, the approaching-object detector 10 of FIG. 2 may detect an object approaching the own vehicle with high accuracy.

Note that the approaching-object detector 10 of FIG. 2 may be configured by using a computer of a standard hardware configuration.

Figure 7:
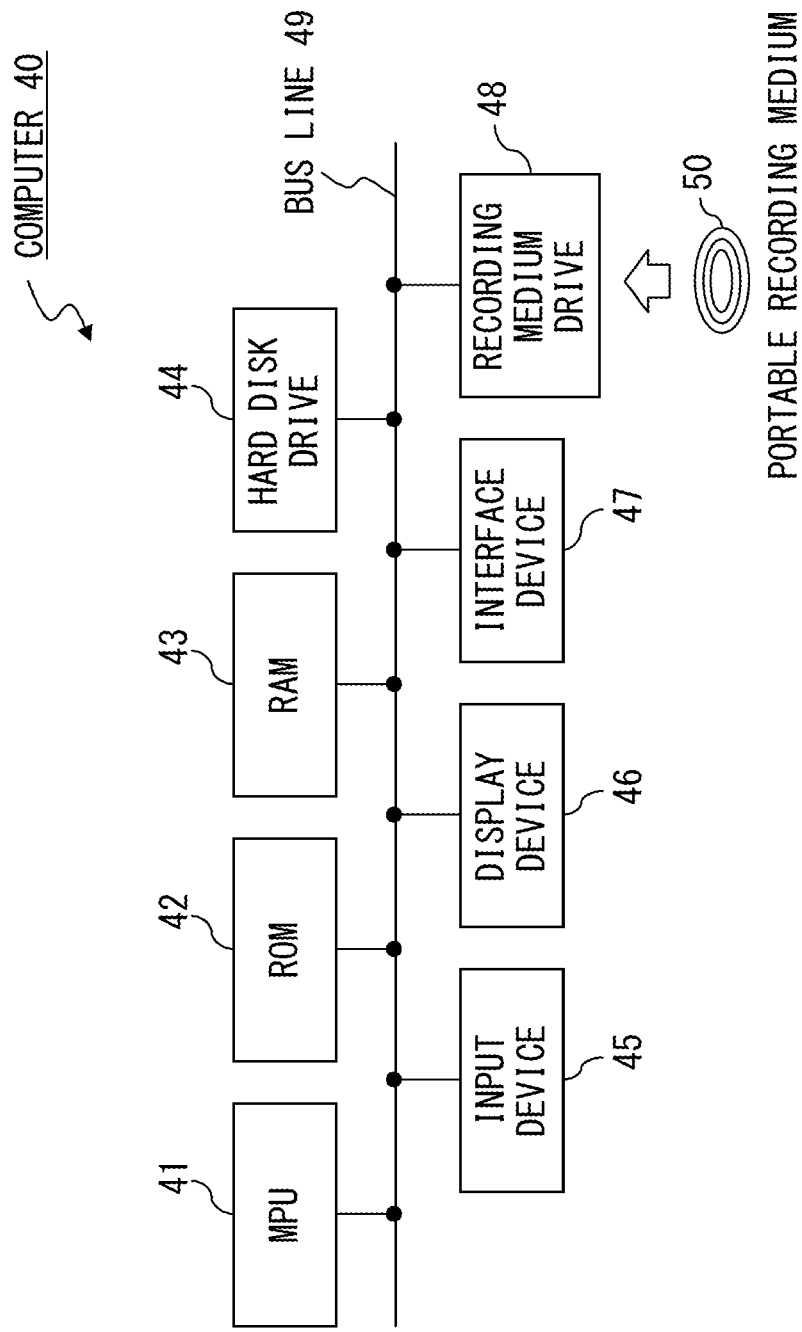
FIG. 7 illustrates an example of the hardware configuration of a computer.

Here, FIG. 7 will be explained. FIG. 7 illustrates an example of the hardware configuration of a computer, and illustrates an example in which the approaching-object detector 10 whose functional block is illustrated in FIG. 2 may be installed.

A computer 40 includes an MPU 41, a ROM 42, a RAM 43, a hard disk drive 44, an input device 45, a display device 46, an interface device 47, and a recording medium drive 48. These elements are connected to each other via a bus line 49, and may transmit or receive various kinds of data to/from each other under the control of the MPU 41.

The MPU (Micro Processing Unit) 41 is a processor that controls the entire operation of the computer 40.

The ROM (Read Only Memory) 42 is a read-only semiconductor memory in which a specified basic control program is stored in advance. The MPU 41 reads and executes such a basic control program at the time of the startup of the computer 40, thereby controlling the operation of the elements of the computer 40.

The RAM (Random Access Memory) 43 is an anytime-writable/readable semiconductor memory that is used as a working storage as requested when the MPU 41 executes various kinds of control programs.

The hard disk drive 44 is a storage device for storing various kinds of control programs to be executed by the MPU 41 or various kinds of data. The MPU 41 reads and executes a specified control program stored in the hard disk drive 44, thereby performing various kinds of control processes.

The input device 45 is, for example, a keyboard device and a mouse device, and when the input device 45 is operated by a user of the computer 40, various kinds of information input by the user, which corresponds to the operation, is obtained and the obtained input information is sent to the MPU 41.

The display device 46 is, for example, a liquid crystal display, and displays various kinds of texts or images according to the display data sent from the MPU 41.

The interface device 47 manages transmitting and receiving processes of various kinds of data with various kinds of equipment connected to the computer 40. In particular, the interface device 47 acquires chronologically captured images (moving images) sent from the vehicle-mounted camera 20, or sends data to the warning unit 30.

The recording medium drive 48 is a device that reads various kinds of control programs or data stored in a portable recording medium 50. The MPU 41 may be configured to perform various kinds of control processes as will be described later by reading and executing a specified control program stored in the portable recording medium 50 via the recording medium drive 48. The portable recording medium 50 may be, for example, a flash memory provided with a USB (Universal Serial Bus) connector, a CD-ROM (Compact Disc Read Only Memory), and a DVD-ROM (Digital Versatile Disc Read Only Memory).

In order to operate such a computer 40 as the approaching-object detector 10, firstly, a control program is created that causes the MPU 41 to execute what is performed by the approaching-object detecting process illustrated in FIGS. 3A and 3B. The created control program is stored in the hard disk drive 44 or the portable recording medium 50 in advance. The MPU 41 is given a specified instruction to read and execute the control program. By so doing, the MPU 41 serves as the functional blocks illustrated in FIG. 2, and the computer 40 will operate as the approaching-object detector 10.

The approaching-object detector 10 may be configured by using a computer system that includes a terminal device and a server device capable of transmitting and receiving various kinds of data to/from the terminal device. When the approaching-object detector 10 of FIG. 2 is configured by using such a computer system, for example, the terminal device provided for the own vehicle is provided with a communication device for communicating with the server device, the vehicle-mounted camera 20 and the warning unit 30 of FIG. 4 are connected to the terminal device. On the other hand, the server device includes, for example, configuration of the computer 40 of FIG. 7. Note that the interface device 47 includes a communication device for managing the data communication with the communication device of the terminal device. The terminal device sends the chronologically captured images (i.e., moving images) obtained by the vehicle-mounted camera 20 to the server device. On the other hand, the server device performs the approaching-object detecting process as described above based on the captured images received from the terminal device, and sends the resultant data to the terminal device such that the terminal device will control the operation of the warning unit 30. As discussed above, the approaching-object detector 10 as described above may be configured by using a computer system.

An approaching-object detector, as described above in the present specification, has an advantageous effect that an object approaching the own vehicle may be detected with high accuracy.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a depicting of the superiority and inferiority of the invention. Although the embodiments of the present invention have been described in detail, it should be understood that the various changes, substitutions, and alterations could be made hereto without departing from the spirit and scope of the invention.

What is claimed is:

1. An approaching-object detector for detecting an object approaching an own vehicle, the approaching-object detector comprising:
   a memory; and
   a processor configured to perform a process including
      extracting a plurality of corresponding feature points from chronologically captured images, which are obtained by capturing the object using an imaging device provided for the own device,
      detecting a behavior among the captured images in regard to each of the plurality of feature points by detecting an optical flow in regard to each of the plurality of feature points from the chronologically captured images,
      determining whether or not the behavior is random in regard to each of the plurality of feature points based on an amount of a temporal change in a direction of the optical flow, and
      determining whether or not the object is approaching the own vehicle based on a behavior of a feature point whose behavior is determined to be not random among the plurality of feature points, and outputting a result of the determination.

2. The approaching-object detector according to claim 1, wherein
   the determining whether or not the behavior is random includes calculating a change in a direction of optical flow between chronologically continuous two optical flows in regard to one of the plurality of feature points extracted by the extraction unit, determining that a behavior of the one feature point is random when a degree where the change in the direction is equal to or greater than a specified angle is greater than a specified degree during a specified period of time, and determining that a behavior of the one feature point is not random when the degree is smaller than the specified degree during the specified period of time.

3. A method for causing a computer to detect an object approaching an own vehicle, the method comprising:
   extracting a plurality of corresponding feature points from chronologically captured images, which are obtained by capturing the object using an imaging device provided for the own device;
   detecting a behavior among the captured images in regard to each of the plurality of feature points by detecting an optical flow in regard to each of the plurality of feature points from the chronologically captured images;

determining whether or not the behavior is random in regard to each of the plurality of feature points based on an amount of a temporal change in a direction of the optical flow; and determining whether or not the object is approaching the own vehicle based on a behavior of a feature point whose behavior is determined to be not random among the plurality of feature points, and outputting a result of the determination.

4. The method according to claim 3, wherein
the determining whether or not the behavior is random includes calculating a change in a direction of optical flow between chronologically continuous two optical flows in regard to one of the plurality of feature points extracted from the chronologically captured images, determining that a behavior of the one feature point is random when a degree where the change in the direction is equal to or greater than a specified angle is greater than a specified degree during a specified period of time, and determining that a behavior of the one feature point is not random when the degree is smaller than the specified degree during the specified period of time.

5. A non-transitory computer-readable recording medium having stored therein a program for causing a computer to execute a process for detecting an object approaching an own device, the process comprising:

extracting a plurality of corresponding feature points from chronologically captured images, which are obtained by capturing the object using an imaging device provided for the own device;

detecting a behavior among the captured images in regard to each of the plurality of feature points by detecting an optical flow in regard to each of the plurality of feature points from the chronologically captured images;

determining whether or not the behavior is random in regard to each of the plurality of feature points based on an amount of a temporal change in a direction of the optical flow; and determining whether or not the object is approaching the own vehicle based on a behavior of a feature point whose behavior is determined to be not random among the plurality of feature points, and outputting a result of the determination.

6. The non-transitory computer-readable recording medium according to claim 5, wherein
the determining whether or not the behavior is random includes calculating a change in a direction of optical flow between chronologically continuous two optical flows in regard to one of the plurality of feature points extracted from the chronologically captured images, determining that a behavior of the one feature point is random when a degree where the change in the direction is equal to or greater than a specified angle is greater than a specified degree during a specified period of time, and determining that a behavior of the one feature point is not random when the degree is smaller than the specified degree during the specified period of time.

* * * * *